UNITED STATES PATENT OFFICE.

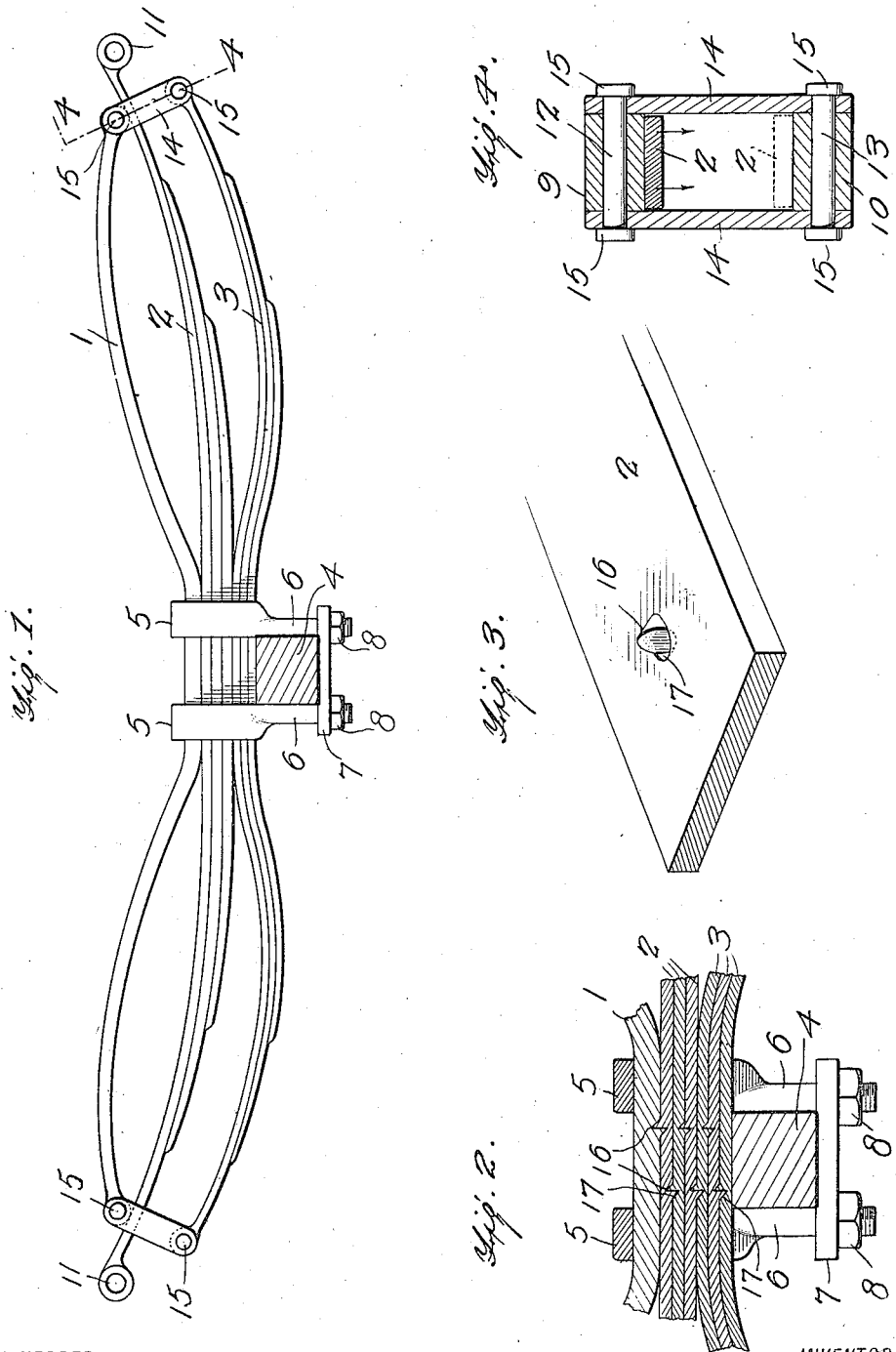

EDWARD JOSEPH STACEY, OF EL CENTRO, CALIFORNIA.

SPRING.

1,129,611.　　　Specification of Letters Patent.　　Patented Feb. 23, 1915.

Application filed July 29, 1913. Serial No. 781,793.

*To all whom it may concern:*

Be it known that I, EDWARD J. STACEY, a citizen of the United States, and a resident of El Centro, in the county of Imperial and State of California, have invented a new and useful Improvement in Springs, of which the following is a specification.

My invention is an improvement in springs, and has for its object to provide a spring of the multiple leaf type, wherein the leaves of the spring are separated into series or sections and so arranged between the vehicle and the running gear, that the several series or sections of the spring will come into operation in succession, each succeeding series or section supplementing the action of the preceding series or section.

A further object is to provide mechanism in connection with springs of the type specified, for preventing the leaves constituting the spring from shifting longitudinally with respect to each other.

In the drawings:—Figure 1 is a side view of a leaf spring constructed in accordance with the invention, Fig. 2 is an enlarged partial longitudinal section of the spring at the point where the leaves contact, Fig. 3 is a perspective view of a portion of one of the leaves, and Fig. 4 is an enlarged section taken on the line 4—4 of Fig. 1.

In the present embodiment of the invention, a spring is shown consisting of seven leaves, and the leaves are arranged in three series or sections. The upper section 1 is composed of a single leaf, the intermediate or central section 2 is composed of three leaves, and the lower series or section 3 is also composed of three leaves. It is obvious however, that any series or sections might consist of more or less leaves than shown, the present arrangement being preferred for reasons that will hereafter appear.

The springs are connected to a support 4, as for instance, an axle or a bolster, by means of the usual U-shaped clips, two clips being used, each clip consisting of a body 5, arranged transversely of the sections and arms 6, the said arms extending on opposite sides of the spring and on the same side of the support 4. The arms extend below the support 4, and the registering or adjacent arms of the clips are engaged by plates 7, the said plates being arranged below the support and having openings through which the arms extend, and nuts 8 are threaded on to the arms below the plate. At the support 4, the leaves of the several sections are superposed, and are clamped tightly together by means of the clips.

On each side of the support, the ends of the section 1 of the spring are arched and are arranged with the convex surface upwardly as shown in Fig. 1. On each side of the support, the ends of the sections 2 and 3 are also arched, the arch of the ends of the section 3 being of shorter radius than the arch of the ends of the section 2, and the arch of both of the sections 2 and 3 is downward or in the opposite direction to the arch of the section 1. By this arrangement, the upper and lower sections of the spring are separated or spaced apart from the central section.

Each end of the section 1 of the spring is provided with a bearing 9, and each end of the uppermost leaf of the section 3 is also provided with a bearing 10. The uppermost leaf of the section 2 of the spring is extended beyond the ends of the upper and lower sections as shown in Fig. 1, and each end of the said leaf is provided with a bearing 11. Journal pins 12 and 13 are passed through the bearings 9 and 10 of the upper and lower sections, at each end of the spring, and the said journal pins at each end of the spring are connected by plates 14, the said plates being arranged at opposite sides of the springs, and being held in place by the journal pins 12 and 13. The said pins 12 and 13 are headed outside the plates 14 as indicated at 15, and the uppermost leaf of the section 2 extends between the plates at each end of the spring, as shown in Fig. 1. The several sections of the spring are so arranged that normally the ends of the central section will contact with the bearings 9 of the uppermost section, and by means of the bearings 11 of the said central section, the spring shown may be connected with one of the two elements between which the spring is arranged, the support 4 being connected with the other element.

When the improved spring is used in an automobile, for instance, the support 4 would be connected with the running gear, and the central section 2 would be connected with the body of the vehicle, or with the upper member of the spring, when an elliptical spring was used. When the elements between which the spring is arranged move toward each other, the central section will first feel the effect of the said movement, and the ends of the said central section will be moved toward the bearings 10 of the lowermost section. Should however, the movement be sufficient to cause the ends of the central section to engage the bearings 10, of the lower section, both the upper and the lower sections of the spring will come into action to cushion the said movement. On account of the above-described arrangement, an extremely easy action of the spring is obtained. With all of the leaves of the new spring in contact, the spring would be very rigid, and would hardly cushion light shocks.

The stronger a spring constructed as above mentioned, that is, with leaves superposed, the more rigid and unyielding the spring. With the present construction however, the spring may be as heavy as may be desired, yet the spring will react to the lightest shock, thoroughly cushioning the same as well as the heavy shocks. The central sections may be of any desired strength, depending of course upon the weight to be carried, and the said central section may be so proportioned that it will normally hold the dead weight in the position shown in Fig. 1. When so arranged, the lighter shocks will be cushioned as fully and completely as the heavier shocks.

In the usual construction of leaf springs, the leaves are held in superposed position by the clips 5—6 shown in Figs. 1 and 2, and it is practically impossible to clamp the leaves so closely together that they may not move longitudinally when the vehicle is in motion, this movement being due to the constant relative change in position of the leaves.

In order to prevent relative movement of the leaves, the mechanism shown in Fig. 2 is provided. Each of the intermediate leaves of the spring is provided on its inner face with a spur or lug 16, the said spur or lug being formed in the present instance by striking the same up from the material of the leaf, and the spur or lug is approximately triangular in cross section when the cross section extends longitudinally of the leaf. Adjacent to the lug, each of the intermediate leaves is provided with a recess or depression 17, the said recess or depression being formed by the striking up of the lug, that is, the recess or depression is formed by the removal of the material which is struck up to form the lug. Each of the lugs has one of its faces approximately perpendicular to the face of the leaf, and the recess or depression has one of its walls perpendicular, and continuous with the perpendicular wall of the lug or spur.

The intermediate leaves of the spring differ from the outer, that is, the upper and lower leaves, in the single respect that each of the said intermediate leaves is provided on each of its faces with the struck-up spur or lug 16 and the depression or recess 17. The outermost, that is, the upper and lower leaves, have the lug and depression on their inner faces only. Preferably the lugs and recesses on the opposite faces of the intermediate leaves are offset longitudinally of the leaf from each other, and the recesses or depressions are of a depth to correspond approximately to one-half the thickness of the leaf.

Each lug is symmetrical with respect to the adjacent recess, and the lugs and the recesses of the meeting faces of the adjacent leaves are so arranged that the lug of each leaf will fit the recess of the adjacent leaf as shown in Fig. 2. With this arrangement it will be obvious that when the leaves of a section are clamped together by the clips, the lugs or spurs will enter the recesses or depressions, thus causing the leaves of the spring to interlock with each other, to prevent relative longitudinal movement of the leaves. The construction adds but a trifle to the cost of the springs, and the lugs or spurs may be struck up or may be formed in any other desired manner.

Each lug or recess is preferably at a point midway of the width of the leaf, and all of the lugs and recesses are between the clips, so that the said leaves are firmly clamped together on each side of the lugs and depressions and there can be no danger of disengagement as long as the clips hold.

I claim:—

1. A leaf spring comprising an intermediate and upper and lower sections, means for clamping the leaves of the several sections in superposed position at the center of the spring, the ends of the uppermost section being arched upwardly on each side of the clamping means and the ends of the intermediate and lower sections being arched downwardly on each side of the said means, the arch of the lower section being of greater radius than the arch of the intermediate section, each section having a bearing at its outer end and the intermediate section being of greater length than the upper and lower sections and extending beyond the same at the ends of the spring, plates arranged on each side of the ends of the sections, said plates having openings registering with the bearings at the ends of the upper and lower sections, journal pins passing through the bearings and engaging the openings, the intermediate section being arched to normally bear against the ends of the upper section.

2. A leaf spring comprising an intermediate and upper and lower sections, means for clamping the leaves of the several sections in superposed position at the center of the spring, the ends of the uppermost section being arched upwardly on each side of the clamping means and the ends of the intermediate and lower sections being arched downwardly on each side of the said means, the arch of the lower section being of greater radius than the arch of the intermediate section, the ends of the central section being extended beyond the ends of the upper and lower sections and normally bearing against the ends of the said upper section, and a rigid connection between the ends of the upper and lower section on each side of the central section.

3. A leaf spring comprising an intermediate and upper and lower sections, means for clamping the leaves of the several sections in superposed position at the center of the spring, the ends of the uppermost section being arched upwardly on each side of the clamping means and the ends of the intermediate and lower sections being arched downwardly on each side of the said means, the arch of the lower section being of greater radius than the arch of the intermediate section, the ends of the central section being extended beyond the ends of the upper and lower sections, and a rigid connection between the ends of the upper and lower sections.

4. A leaf spring comprising an intermediate and upper and lower sections, means for clamping the several sections in superposed position at the center of the spring, the ends of the uppermost section being arched upwardly on each side of the clamping means, and the ends of the lower section being arched downwardly on each side of the said means, the ends of the central section being extended beyond the ends of the upper and lower sections, and a rigid connection between the ends of the upper and lower sections.

5. In a leaf spring, the combination with the superposed leaves and the clips for clamping the leaves together, of a spur or lug on the inner face of the outermost leaves, said spurs or lugs being arranged approximately midway the width of the leaf, and between the clips, each of the said outermost leaves having a depression adjacent to the spur or lug and corresponding in size and shape to the lug, the intermediate leaves each having a lug and a recess on each face similar to the lug and the recess of the outermost leaves, each recess being adapted to receive the lug on the adjacent face of the adjacent leaf, the lugs and recesses on the aforesaid faces of the intermediate leaves being offset longitudinally with respect to each other.

6. In a leaf spring, superposed leaves, each of the outermost leaves having a lug on its inner face, and a recess adjacent to the lug and symmetrical as regards position and shape with respect to the lug, the innermost leaves having on each face a lug and a recess symmetrical as regards shape and position with respect to the lugs, the lug on each leaf engaging the recess on the adjacent face of the adjacent leaf.

7. In a leaf spring, a series of superposed leaves, each of the outermost leaves having on its inner face a lug and a recess symmetrical in arrangement and size, each of the intermediate leaves having on each face a lug and a recess symmetrical with respect to each other, said lugs and recesses interengaging, and means for clamping the leaves together at the outer side of the lugs and recesses.

EDWARD JOSEPH STACEY.

Witnesses:
 JULIUS MILLER,
 SIMON DESCHLER.